United States Patent [19]
Ortlieb

[11] 3,767,317
[45] Oct. 23, 1973

[54] DOUBLE BLADED CUTTING TOOL
[75] Inventor: Robert M. Ortlieb, Southfield, Mich.
[73] Assignee: Devlieg Machine Company, Royal Oak, Mich.
[22] Filed: Nov. 8, 1971
[21] Appl. No.: 196,519

[52] U.S. Cl. ................................................. 408/183
[51] Int. Cl. ............................................. B23b 29/034
[58] Field of Search .................... 408/183, 182, 181; 82/25

[56] References Cited
UNITED STATES PATENTS
2,623,420 12/1952 Harris ................................. 408/183
704,057 7/1902 Liethegener ......................... 408/183
3,124,980 3/1964 Gill et al. ............................. 408/183

Primary Examiner—Gil Weidenfeld
Attorney—J. King Harness et al.

[57] ABSTRACT

A double bladed cutting tool in which two cutter supports are positioned at the oposite ends of a transverse guideway formed in a rotary tool body. A single adjusting screw has two threads of opposite direction threaded through the cutter supports. Depending upon the direction of rotation of the screw, the cutter supports are either advanced outwardly or withdrawn inwardly in the guideway.

2 Claims, 7 Drawing Figures

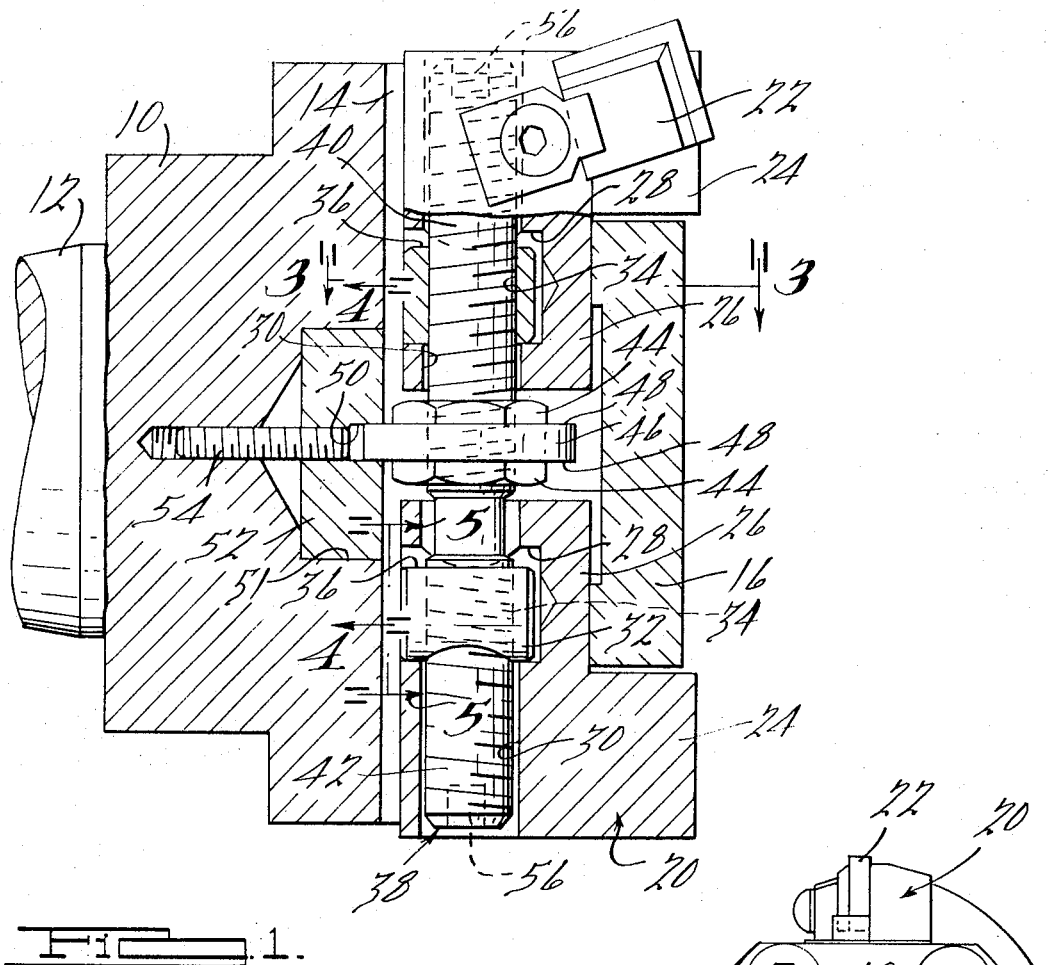
FIG. 1.
FIG. 2.
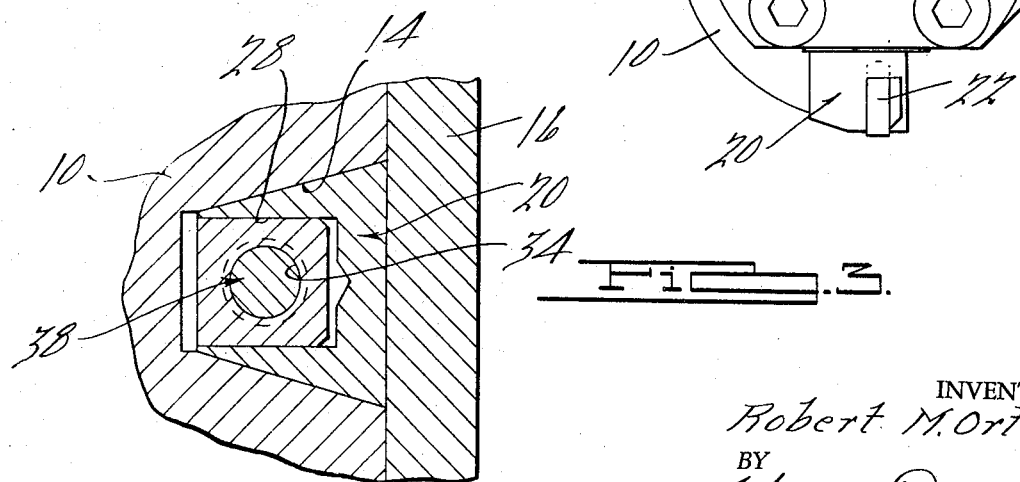
FIG. 3.
INVENTOR.
Robert M. Ortlieb

PATENTED OCT 23 1973 3,767,317

INVENTOR.
Robert M. Ortlieb.
BY
Harness, Dickey & Pierce.
ATTORNEYS.

DOUBLE BLADED CUTTING TOOL

SUMMARY OF THE INVENTION

Double bladed cutting tools are customarily used to remove substantial amounts of metal from cylindrical bores and the like. They do not possess the inherent accuracy of single point cutting tools but are used for what is generally termed "rough" work. Such cutting tools are frequently mounted in the spindle of a milling, boring or similar machine tool although they may also be used on turning machines wherein the workpiece is rotated and the tool is held stationary.

Many double bladed cutting tools have been incapable of adjustment to compensate wear on the cutters thereof. Other double bladed cutting tools have possessed such a minimal degree of accuracy and rigidity as to substantially limit their usefulness. It is therefore an object of the present invention to provide a double bladed cutting tool which is relatively accurate as compared to most double bladed cutting tools and which may be adjusted in a highly convenient manner to compensate for wear on the cutters thereof or to adapt the tool to bores of varying size. It is another object of the present invention to provide a double bladed cutting tool which is relatively inexpensive of manufacture, which is of rugged and durable construction and which is highly convenient to use. It is still another object of the present invention to provide a double bladed cutting tool in which both cutters are simultaneously adjusted by the rotation of a single screw.

DESCRIPTION OF THE VIEWS OF THE DRAWING

FIG. 1 is a sectional view of a double bladed cutting tool made in accordance with the present invention;

FIG. 2 is a reduced size end elevational view of the structure of FIG. 1;

FIGS. 3, 4 and 5 are sectional views of the structure illustrated in FIG. 1 taken along the lines 3—3, 4—4 and 5—5 thereof, respectively;

DESCRIPTION OF THE PREFERRED EMBODIMENTS

Figure 4:
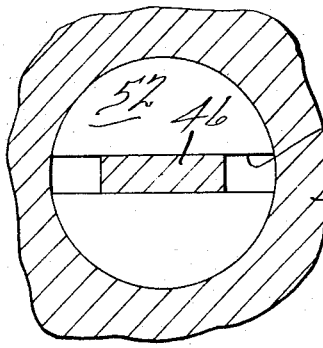
Figure 5:
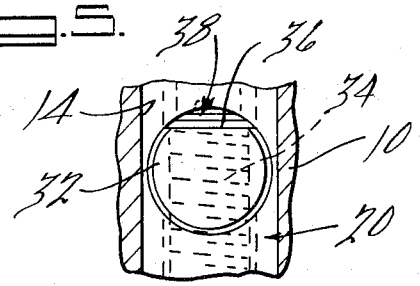

Referring now to FIG. 1, the invention is illustrated in the form of a rotary tool holder body 10 having a shank 12 adapted to be received in the drive spindle (not shown) of a boring, milling or similar machine tool. It will be appreciated, however, that the invention may be embodied in a stationary tool adapted to be used with turning machines or the like wherein the workpiece rather than the tool is rotated. As illustrated herein, the tool holder body 10 has a transverse or radial guideway 14 extending diametrically thereacross and open at its opposite ends. The guideway 14 is closed at its forward end by a cover plate 16 held in place by four screws 18.

A pair of cutter supports 20 are positioned within the guideway 14 and project from the opposite ends thereof. Each cutter support 20 carries a removable carbide cutter 22. Looking at FIG. 3, it will be seen that the guideway 14 is of a "V" way cross sectional shape. Each cutter support 20 is of a conforming cross sectional shape designed to be snugly but slidably supported within the guideway 14 for rectilinear radial movement therealong. Each of the cutter supports 20 is of generally L-shaped configuration, having a forwardly projecting outer mounting portion 24 and an inner guide portion 26.

A blind bore 28 is drilled into each guide portion 26 in order to intersect with a bore 30 extending radially through each bore parallel to the guideway 14. The axes of the bores 28 and 30 intersect and each bore 28 serves to receive a cylindrical plug 32 having an internally threaded transverse bore 34 which will align coaxially with the bore 30. It will be seen that each plug 32 is freely rotatable in its bore 28 when the parts are initially assembled. However, each plug 32 has a flat surface 36 formed along one side thereof which facilitates rotation of the plug in the bore 28 to align the plug bore 34 with the bore 30. For practical end use purposes, the plug 32 may be regarded as providing threads directly in its cutter support 20. The separate plugs 32 are used simply for manufacturing convenience and assure the alignment of the threads 34 of the two cutters 20 in at least one plane. The bores 30 are slightly larger than the screw 38 to assure a proper clearance therebetween despite any slight misalignment between the bores 30 of the two cutter supports 20.

The screw 38 is formed with a first thread 40 which is of right hand and a second thread 42 which is a left hand thread. The threads 40 and 42 are of precisely the same pitch. It will be noted that the right hand thread 40 is of greater length than the left hand thread 42 and extends past the midpoint of the screw 38. The purpose of this is to permit the mounting on the right hand thread 40 of a pair of nuts 44 which clamp a washer 46 therebetween. The washer 46 defines a flange or annular shoulder on the screw 38 having flat opposite faces 48. The periphery of the washer 46 passes through a slot 50 formed in a plug 52 and aligned with the axis of rotation of the tool. The plug 52 is held in place within a recess 51 at the bottom of the guideway 14 by means of a setscrew 54. The purpose of the plug 52 and its slot 50 is to prevent movement of the screw 38 in a direction parallel to its longitudinal axis. The screw 38 is provided with wrench receiving sockets 56 at its opposite ends. By the insertion of a wrench (not shown) in either of the sockets 56 the screw 38 may be rotated. When the screw 38 is rotated in one direction, the cutter supports 20 will be moved in diametrically opposite directions. When the screw 38 is rotated in the opposite direction, the cutters 20 will be drawn toward one another within the guideway 14. It should be noted that the dimensions of the cover plate 16 are such as to closely confine the cutter supports 20 without clamping them in place. The forces acting on the cutters 22 during use are such that the cutter supports 20 are not dislodged from their positions on the screw 38 and the screw 38 is capable of holding them against movement in the guideway 14.

When the tool of FIGS. 1-5 is initially assembled there will be no assurance that the two cutters 22 are precisely equidistant from the axis of rotation of the shank 12. In order to correct this situation the washer 46 is adjusted along the length of the right hand screw 40 to position each cutter 22 the same distance from the axis of rotation of the shank 12. Once the washer 46 has been properly set up, subsequent rotation of the screw 38 will vary the positions of the cutters 22 equally, moving said cutters the same distance from the axis of rotation. Accordingly, the rotation of the single screw 38 is all that is needed to adjust both cutters 22.

Figure 6:
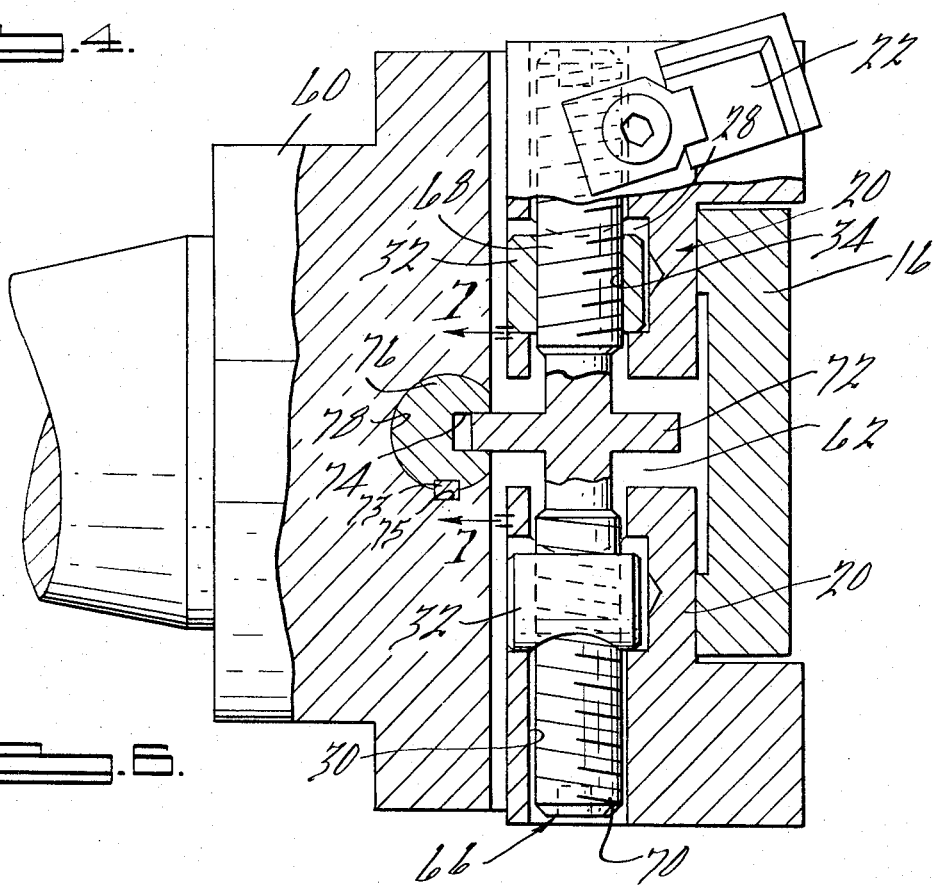
FIG. 6 is a view of structure similarly illustrated in FIG. 1 showing a modified form of the invention.
Figure 7:
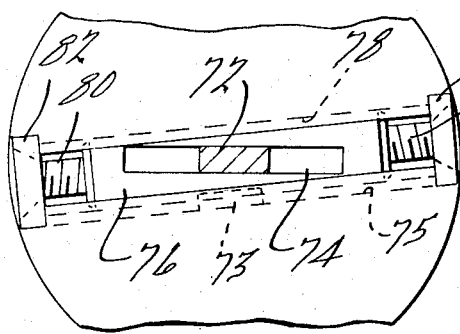
FIG. 7 is a sectional view of the structure illustrated in FIG. 6 taken along the line 7—7 thereof.

FIGS. 6 and 7 illustrate a slightly modified form of the present invention which utilizes many of the same parts as the form of the invention illustrated in FIGS. 1 to 5. The common parts are denoted by the same numbers as were used in the description of the embodiment of FIGS. 1 to 5.

The tool of FIGS. 6 and 7 utilizes a rotary tool holder body 60 having a V-shaped guideway 62 extending diametrically across its face. The front of the guideway 14 is closed by the cover plate 16. A pair of cutters 20 identical to those used in the prior embodiment of the invention are positioned within the guideway 62 and project from the opposite ends thereof. The cutters 20 incorporate the plugs 32 with their threaded bores 34.

The tool of FIGS. 6 and 7 is distinguished by a screw 66 having a right hand thread 68 at one end thereof and a left hand thread 70 at its opposite end. The screw 66 is formed with an integral annular flange 72 intermediate the threads 68 and 70. The peripheral margin of the flange 72 passes through a slot 74 formed in a cylindrical plug 76. The plug 76 is snugly but slidably fitted within a bore 78 of the body 60. While the slot 74 is parallel to the flange 72, the plug 76 and bore 78 are inclined with respect to the slot 74 and the flange 72. The flange 72 only occupies a small portion of the slot 74, with the flange being slidable in the slot. As the bore 78 is inclined with respect to the axis of the screw 66, the shifting of the plug 76 in its bore 78 will bodily shift the screw 66 and its cutters 20 in the guideway 62. When the plug 76 is moved longitudinally in its bore 78, the side of the slot 74 applies an axial force to the flange 72 which causes the flange to slide within the slot 74. A key 73 carried by the plug 76 slides in a keyway 75 formed axially in the bore 78 in preventing rotation of the plug. The position of the plug 76 in the bore 78 is controlled by a pair of drawscrews 80 which seat against washers 82 positioned at the opposite ends of the bore 78. By loosening one of the screws 80 and tightening the other of said screws the shifting of the plug 76 in the bore is accomplished. The purpose of adjusting the position of the plug 76 is, of course, to locate the cutters 22 equal distance from the axis of rotation of the tool.

It will be apparent that by rotating the screw 66, the cutters 20 may be either moved in oppositely outward directions or drawn toward one another within the guideway 62. After threading of the cutters 22 on the screw 66, the cutters will generally be found to be an unequal distance from the axis of rotation of the tool body 60. This, however, is compensated for by the positioning of the plug 76. Once this setting is made, subsequent adjustment of the screw 66 will move each of the supports 20 equally and both of said supports will remain an equal distance from the axis of rotation of the tool.

The assembly of both of the embodiments of the invention illustrated herein is easily made with the cover plate 16 removed. A subassembly consisting of the screw 38 or 66 and both cutter supports 20 is inserted into the guideway 14 or 62. Thereafter the cover plate 16 is installed in order to confine the cutters 22 within their guideway. Longitudinal movement of such subassembly is, of course, prevented by the engagement of the washer or flange 46 or 72 in the slot 50 or 74. Thereafter the cutters 22 are unable to move in the same direction but may only move toward one another or away from one another within their guideways in accordance with the direction of rotation of the screw 38 or 66. Both forms of the invention have been found to rigidly hold the cutters 22 in a direction radially of the bore to be machined. Once the initial "setup" of the tool has been made, however, subsequent adjustments of the cutters are very easily made by the simple rotation of a single screw and without the necessity of loosening separate clamping or locking means.

What is claimed is:

1. A double bladed cutting tool including a tool body having a guideway extending thereacross, a pair of cutter supports nonrotatably supported in said guideway for sliding movement therealong and projecting from said guideway at the opposite ends thereof, an adjusting screw extending parallel to said guideway and having coaxial threads of opposite direction at its opposite ends, said threads being threadably engageable with internally threaded means on said cutter supports whereby rotation of said screw is operable to adjust said supports toward or away from one another in said guideway, an annular shoulder on said screw extending radially of the thread axis of said screw, said shoulder member being adjustable on said screw in a direction parallel to the thread axis thereof, and means on said body defining a slot engaging a peripheral portion of said flange to restrain movement of said screw in the direction of its thread axis.

2. The structure set forth in claim 1 in which said shoulder member comprises a washer clamped between a pair of nuts threaded on said screw.

* * * * *